No. 753,020. Patented February 23, 1904.

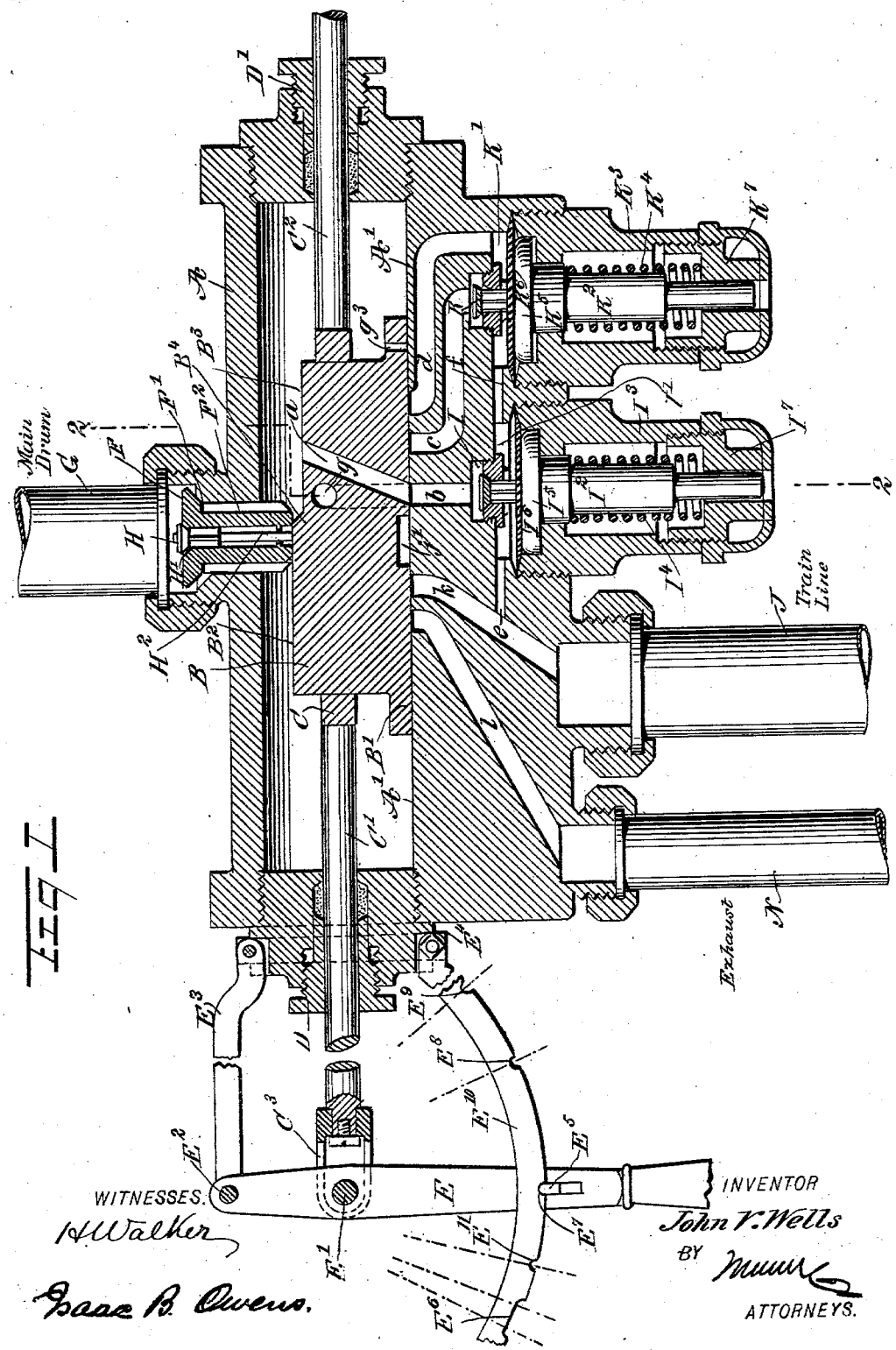

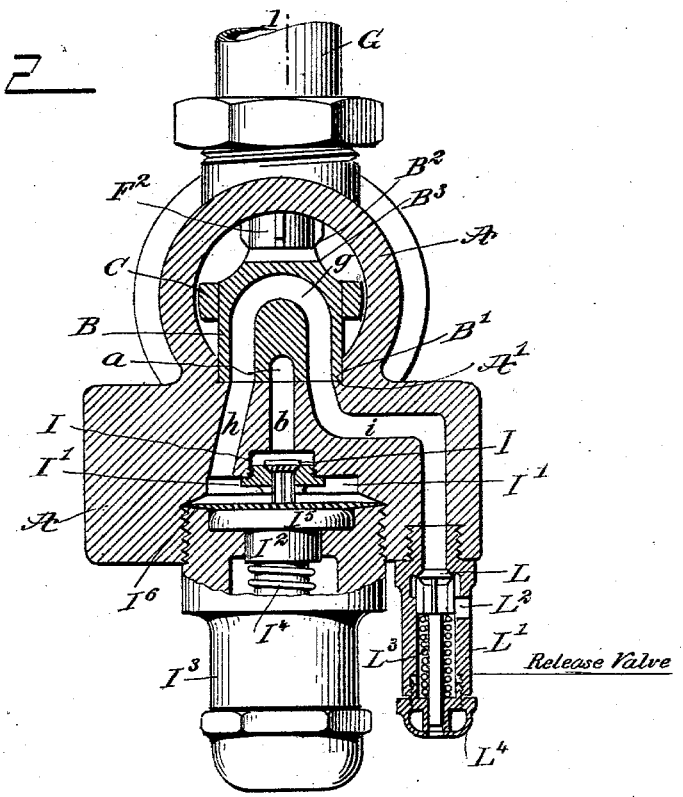
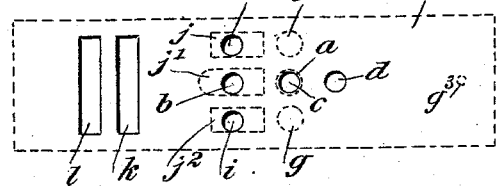
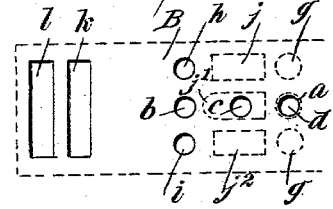
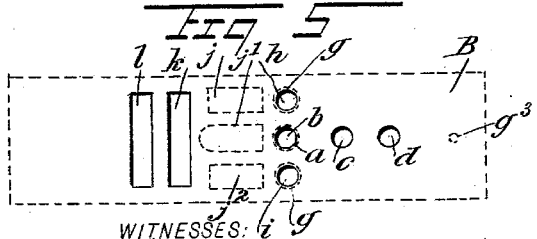
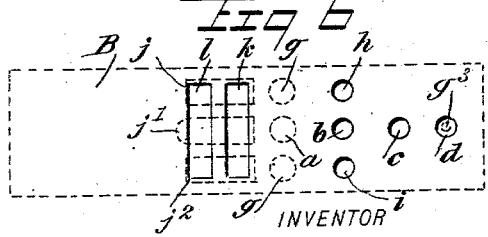

UNITED STATES PATENT OFFICE.

JOHN V. WELLS, OF BRADDOCK, PENNSYLVANIA.

BRAKE-VALVE.

SPECIFICATION forming part of Letters Patent No. 753,020, dated February 23, 1904.

Application filed January 3, 1903. Serial No. 137,651. (No model.)

*To all whom it may concern:*

Be it known that I, JOHN V. WELLS, a citizen of the United States, and a resident of Braddock, in the county of Allegheny and State of Pennsylvania, have invented a new and Improved Brake-Valve, of which the following is a full, clear, and exact description.

This invention relates to a brake-valve the principal object of which is to obtain by a relatively simple construction a greater control over the train-line pressure—that is to say, to be able to increase or diminish and to hold the pressure at any desired degree.

The invention is designed especially for operating my improved triple valve as disclosed in my prior patent, No. 620,201, dated February 28, 1899, and in my copending application, Serial No. 135,738, filed December 18, 1902.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a longitudinal section of the valve on the line 1 1 of Fig. 2. Fig. 2 is an irregular cross-section on the line 2 2 of Fig. 1. Fig. 3 is a diagram showing the relative position of the ports when the valve is on lap after an increase. Fig. 4 is a diagram showing the relative position of the ports upon a train-line increase. Fig. 5 is a diagram showing the relative position of the ports when in the running or release position, and Fig. 6 is a diagram showing the relative position of the ports upon an emergency train-line reduction.

A indicates the body or shell of the valve, and B indicates the slide-valve proper.

C indicates a strap which encircles the slide-valve, and $C'$ and $C^2$ indicate stems which slide through stuffing-boxes, respectively, in the ends of the shell A. The stem $C'$ has a hand-lever E, connected thereto by means of a loop $C^3$ and pin $E'$. The lever E is fulcrumed on a pin $E^2$, carried by an arm $E^3$, which is fastened to the stuffing-box D, through which the rod $C'$ moves through the medium of a clamp $E^4$. The lever E carries a spring-dog $E^5$, which works with a quadrant $E^{10}$, also fastened to the clamp $E^4$. Said quadrant $E^{10}$ has notches $E^6$ $E^{11}$ $E^7$ $E^8$ $E^9$, in either one of which notches the dog $E^5$ is arranged to engage, thus holding the lever E in either one of several positions. The notch $E^6$ is widened, so that the lever E may assume two positions when its dog $E^5$ is engaged in said notch, these two positions representing, respectively, an emergency train-line reduction and a service train-line reduction. The notches $E^{11}$ and $E^8$ hold the valve in the two lap positions. The notch $E^7$ holds the lever in running and release position. The notch $E^9$ holds the lever in position for the train-line increase, and the notch $E^6$ holds the lever in position for train-line service and emergency decrease.

G indicates the main-drum connection, which communicates with the interior of the case or shell A.

F indicates a check-valve which closes against the main-drum pressure, and this check-valve is adapted to be raised from its seat by an incline $B^4$, formed between the top surfaces $B^2$ and $B^3$ of the slide-valve, said check-valve working on a seat $F'$ and having longitudinal grooves $F^2$ in its stem which enables the pressure to pass when the valve is raised, as shown in Fig. 1. The check-valve F is formed with a longitudinal passage, at the upper end of which is seated a minor check-valve H, the stem $H^2$ of which slides in the passage of the valve F. The valve H works against a seat $H'$ in the top of the valve F. When the two valves F and H are seated, the stem $H^2$ projects below the stem of the valve F, and consequently this valve H is raised first. This allows part of the pressure from the main drum to pass into the shell A and enables the major valve F to be more readily raised.

The slide-valve B is formed with a port $a$ running diagonally through it from top to bottom. It is also formed with an arched port $g$, which passes over the top of the lower end of the port $a$, the ends of the port $g$ lying in transverse line with the lower end of the port $a$ and all of said ports opening at the bottom of the slide-valve. The slide-valve is also formed with three transversely-alined cavities $j$, $j'$, and $j^2$, located at the left of the ports $a$ and $g$, and of these cavities the cavity $j'$ is slightly longer than the other cavities, the purpose of which will hereinafter fully appear. Finally, the slide-valve B is formed with a port $g^3$ in its right-hand end, this port extending vertically in the valve.

J indicates the train-line connection, and N the exhaust, these connections J and N, respectively, communicating with ports $k$ and $l$ in the body of the valve, said ports leading up to the seat A' of the slide-valve B and being transversely elongated, as illustrated best in Figs. 3 to 6. A port $b$ is formed in the shell A and leads to the seat A', this port $b$ being adapted to register with the port $a$. Two additional ports $c$ and $d$ are also formed in the shell A and lead to the seat A', these ports $c$ and $d$ being adapted to register with the port $a$ and the port $d$ being adapted to register with the port $g^3$. A port $h$ (see Figs. 2 to 6) is formed in the shell A in transverse line with the port $b$ and adapted to register with one end of the port $g$ of the slide-valve. A port $i$ is also formed in transverse line with the ports $h$ and $g$ and adapted to register with the other end of the port $g$. This port $i$ leads to a case L', which is fastened to the shell A and has an orifice $L^2$ leading to the atmosphere.

L indicates an outwardly-opening valve commanding this vent $L^2$, and $L^3$ indicates a spring the tension of which may be adjusted by a nut $L^4$, this spring serving to seat the valve L against a predetermined pressure, but to yield when this pressure is exceeded and allow the excess to be vented into the atmosphere.

Formed in the shell A are two cavities I' and K'. Of these cavities the cavity I' communicates directly with the port $b$ and the cavity K' communicates with the ports $c$ and $d$, these ports entering the cavity K' at different points, as Fig. 1 illustrates.

$f$ indicates a port placing the cavities I' and K' in communication, and $e$ indicates a port placing the cavities I' and the port $k$ in communication. The port $h$ leads into the cavity I', as shown in Fig. 2.

I indicates a check-valve seating against pressure in the port $b$ and commanding the communication of said port with the cavity I'. This valve has its stem bearing against a diaphragm $I^6$, which constitutes the bottom of the chamber I' and under which is arranged a disk $I^5$, having a stem $I^2$ projected down into a case $I^3$, carried by the shell A.

$I^4$ indicates a spring pressing upward the parts $I^2$, $I^5$, and $I^6$, and this spring is adapted to have its tension regulated at will by a nut $I^7$. The port $d$ opens unrestrainedly into the cavity K'; but the communication of the port $c$ with the cavity K' is controlled by a valve K, which seats against pressure in the port $c$ and has its stem bearing on a diaphragm $K^6$, located in the cavity K' and forming the bottom thereof.

$K^5$ indicates a disk which bears under the diaphragm $K^6$, and $K^2$ indicates the stem of the disk projecting down into a casing $K^3$, fastened to the shell A alongside of the case $I^3$. The parts $K^2$, $K^5$, and $K^6$ are pressed up by a spring $K^4$, the tension of which may be regulated at will by a nut $K^7$.

Such being the construction and organization of the valve, its operation is as follows: Fig. 1 shows the parts in running and release position, in which position the ports occupy the relative adjustment indicated diagrammatically in Fig. 5. The valves H and F are open and the main-drum pressure pervades the interior of the shell A. The ports $a$ and $b$ are in communication and the main-drum pressure bears on top of the check I. The ports $h$, $g$, and $i$ communicate to exhaust any pressure in the chamber I', which is in excess to that at which the spring $L^3$ is adjusted. Assuming now that the spring $I^4$ were adjusted to raise the diaphragm $I^6$ against any pressure less than seventy pounds and that the spring $L^3$ were similarly adjusted. This will prevent the train-line pressure from rising above seventy pounds, since the train-line communicates with the chamber I' by the ports $k$ and $e$. The instant, however, that this pressure of the train-line is lowered (let it be supposed by leakage) the diaphragm $I^6$ will be raised and the check I will be unseated, and the main-drum pressure will flow into the train-line until the train-line pressure is again raised to seventy pounds, whereupon the diaphragm $I^6$ is depressed and the check I is again seated. To increase the train-line pressure, the valve B should be moved to the right, placing the port $a$ in communication with the port $d$. The main-drum pressure then blows directly into the train-line by one of the passages $a$, $d$, K', $f$, I', $e$, and $k$. This adjustment is shown in Fig. 4. To retain this train-line pressure to any desired degree, the slide-valve B should be moved back, placing the ports $a$ and $c$ in registry. Assuming that the increase desired to be retained is five pounds, making a total of seventy-five pounds in the train-line, the spring $K^4$ should be adjusted to raise the diaphragm $K^6$ again under pressure not exceeding seventy-five pounds. When, therefore, the pressure in the train-line falls to seventy-five pounds and the ports $a$ and $c$ are in communication, the diaphragm $K^6$ will be raised and the valve K will be unseated. The main-drum pressure will then flow into the train-line and replenish the supply until seventy-five pounds is again attained in the train-line, whereupon the diaphragm $K^6$ will move down and the valve K will be seated, thus cutting off the train-line communication with the main drum. To effect a reduction of the train-line pressure below the running pressure, which we have above assumed to be seventy pounds, the slide-valve B is moved over to the left. If a service application is desired, this movement should be just sufficient to place the left-hand end of the central cavity $j'$ in communication[2] with the port $l$, leaving the cavities $j$ and $j$ out of communication with the port $l$. To effect an emergency application, this movement should be continued until all of the cavities $j$, $j'$, and $j^2$ connect the ports $l$ and $k$. When this movement takes place, the port $g^3$ moves the port $d$, and therefore the main-drum pressure which pervades the shell A is blown out through the port $l$ by way of the passages $g$, $k$, $e$, $I'$, $f$, $K'$, $d$, and $g^3$. The before-described movements of the slide-valve B to the left will drop the valves F and H, and cut off the main drum from the shell A. The position of the ports on emergency reduction is indicated in Fig. 6. To place the valve on lap after the train-line reduction, the slide-valve should be moved back slightly to the right, not sufficiently, however, to place the ports $a$ and $b$ in communication, but sufficiently to blank the port $l$. These various movements of the slide-valve B are of course regulated by the notches $E^9$, $E^8$, $E^7$, $E^{11}$, and $E^6$ in the quadrant $E^{10}$.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. In a brake-valve, the combination of a casing having main-drum and train-line connections, a slide-valve mounted in the casing and having a port adapted to establish or break communication between said connections, a valve commanding said communication between the train-line and main drum, means controlled by the train-line pressure for operating the valve, the casing and slide-valve having additional ports leading from communication with the train-line, and a pressure-relief device to which said ports lead and whereby the excess pressure of the train-line is exhausted.

2. A brake-valve having a main-drum connection, a valve commanding the same, a train-line connection, and a slide-valve adapted to control the train-line connection, said slide-valve having a surface thereon for operating the main-drum valve.

3. A brake-valve having a main-drum connection, a valve commanding the same, a train-line connection, and a slide-valve adapted to control the train-line connection, said slide-valve having a surface thereon for operating the main-drum valve, and said main-drum valve comprising two parts, seating the one on the other and opening successively, for the purpose specified.

4. In a brake-valve, the combination of a main casing having train-line and main-drum connections, a main-valve cavity communicating with the main-drum connection, and three ports leading to the train-line from the main-valve cavity, valves in two of said ports, said valves seating against the main-drum pressure, means for operating each valve, said means being controlled by the train-line pressure, and a main valve located in the main-valve cavity and commanding said three ports, substantially as described.

5. In a brake-valve, the combination of a main casing having train-line and main-drum connections, a main-valve cavity communicating with the main-drum connection, and three ports leading to the train-line from the main-valve cavity, valves in two of said ports, said valves seating against the main-drum pressure, means for operating each valve, said means being controlled by the train-line pressure, a main valve located in the main-valve cavity and commanding said three ports, and a valve commanding the main-drum connection and operated by the said main valve, substantially as described.

6. In a brake-valve, the combination of a casing having a main-drum and train-line connections, a valve operating in the casing and serving to establish a brake communication between said connections, a means controlled by the train-line pressure for commanding said communication between the train-line and main-drum connections, the said valve and casing having additional ports leading from the communication with the train-line, and a pressure-relief device to which said ports lead and whereby the excess pressure of the train-line is exhausted.

7. A brake-valve having a main-drum connection a valve commanding the same, a train-line connection, and a sliding valve adapted to control the train-line connection, said slide-valve having an incline surface acting against the main-drum valve to operate the same.

8. A brake-valve having a main-drum connection, a valve commanding the same, a train-line connection, and a valve adapted to control the train-line connection, said valve acting against the main-drum valve to operate the same, the said main-drum valve comprising two parts seating the one on the other, and said parts being successively engaged by the second-named valve, whereby successively to operate the said parts of the main-drum valve.

9. A brake-valve having a casing with train-line and main-drum connections, means for controlling the train-line pressure, and a valve commanding the main-drum connection, said valve being seated by the main-drum pressure, and comprising two parts mounted the one on the other and arranged to open successively, for the purpose specified.

10. A brake-valve, having a casing with main-drum and train-line connections, means for controlling the train-line pressure, a valve commanding the main-drum connection, said valve seating by the main-drum pressure and comprising two parts mounting the one on the other, said parts having stems of varying length, and operating members arranged successively to engage said stems.

11. A brake-valve, comprising a casing having train-line and main-drum connections and a main-valve cavity communicating with the main-drum connections, and three ports leading to the train-line from said cavity, valves commanding two of said ports, means controlled by the train-line pressure for operating said valves, and a main valve located in the main-valve cavity and commanding the said three ports.

12. A brake-valve, comprising a casing having main-drum and train-line connections, a main-valve cavity communicating with the main-drum connections and three ports leading to the train-line from the main-drum cavity, valves commanding two of said ports, means controlled by the train-line pressure for operating said valves, a main valve located in the main-valve cavity and commanding said three ports, and means commanding the main-drum connection and operated by the said main valve.

13. A brake-valve, comprising a casing having main-drum and train-line connections, a main-valve cavity and two ports leading from the main-valve cavity into the train-line connection, an automatic valve commanding one of said ports, the second port having a clear passage to the train-line independently of the said valve, and a main valve located in the main-valve cavity and commanding both of the said ports.

14. A brake-valve, comprising a casing having main-drum and train-line connections and also having a main-valve cavity and three ports leading therefrom into the train-line connection, valves commanding two of said ports, means controlled by the train-line pressure for operating said valves, the third port having a clear passage into the train-line independently of said valves, and a main-valve located in the main-valve cavity and commanding the said three ports.

15. A brake-valve, comprising a casing having main-drum and train-line connections, a main-valve cavity and two ports leading from the main-valve cavity into the train-line connection, an automatic valve commanding one of said ports, the second port having a clear passage to the train-line independently of the said valve, and a main valve located in the main-valve cavity and commanding both of the said ports, the said casing also having an exhaust-port and the main valve having a cavity capable of placing the train-line connection and the exhaust-port in communication.

16. A brake-valve, comprising a casing having main-drum and train-line connections and also having a main-valve cavity and three ports leading therefrom into the train-line connection, valves commanding two of the said ports, means controlled by the train-line pressure for operating said valves, the third port having a clear passage into the train-line independently of said valves, and a main valve located in the main-valve cavity and commanding the said three ports, the casing also having an exhaust-port and the main valve having a cavity capable of placing the train-line connection and said exhaust-port in communication.

17. A brake-valve, comprising a casing having main-drum and train-line connections, a main-valve cavity and two ports leading from the main-valve cavity into the train-line connection, an automatic valve commanding one of said ports, the second port having a clear passage to the train-line independently of the said valve, and a main valve located in the main-valve cavity and commanding both of the said ports, the casing and main valve having additional passages leading from the train-line connection, and a pressure-relief device to which said passages lead.

18. A brake-valve, comprising a casing having main-drum and train-line connections and also having a main-valve cavity and three ports leading therefrom into the train-line connection, valves commanding two of the said ports, means controlled by the train-line pressure for operating said valves, the third port having a clear passage into the train-line independently of said valves, and a main valve located in the main-valve cavity and commanding the said three ports, the valve-casing and main valve having additional passages leading from the train-line connection and a pressure-relief device to which said passages lead.

19. A brake-valve having a casing with train-line and main-drum connections, valve devices for controlling said connections, said devices including a slide-valve mounted in the casing, the said casing and slide-valve having ports therein capable of registry to form a passage from the train-line connection to the atmosphere, and a pressure-relief device commanding said passage.

20. A brake-valve having a casing with train-line and main-drum connections, valve devices commanding the same and comprising a slide-valve mounted in the casing, said casing having two ports therein, one leading from the train-line connection and the other leading to the atmosphere, and the slide-valve having an arching port capable of connecting the said two ports of the casing to form a continuous passage, and a pressure-relief device commanding said passage.

In testimony whereof I have signed my name to this specification in the presence of two subscribing witnesses.

JOHN V. WELLS.

Witnesses:
E. H. HUTZEN,
PH. E. GEISS.